(12) United States Patent
Murakami

(10) Patent No.: US 10,496,969 B2
(45) Date of Patent: Dec. 3, 2019

(54) TRANSACTION DEVICE

(71) Applicant: Oki Electric Industry Co., Ltd., Tokyo (JP)

(72) Inventor: Hitotoshi Murakami, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/575,785

(22) PCT Filed: May 11, 2016

(86) PCT No.: PCT/JP2016/064057
§ 371 (c)(1),
(2) Date: Nov. 20, 2017

(87) PCT Pub. No.: WO2016/203875
PCT Pub. Date: Dec. 22, 2016

(65) Prior Publication Data
US 2018/0144317 A1    May 24, 2018

(30) Foreign Application Priority Data

Jun. 15, 2015  (JP) .................................. 2015-120495

(51) Int. Cl.
*G06F 7/08* (2006.01)
*G06Q 20/18* (2012.01)
(Continued)

(52) U.S. Cl.
CPC .......... *G06Q 20/18* (2013.01); *G06Q 20/381* (2013.01); *G07D 9/00* (2013.01); *G07D 13/00* (2013.01);
(Continued)

(58) Field of Classification Search
USPC .................................................. 235/379–381
See application file for complete search history.

(56) References Cited

U.S. PATENT DOCUMENTS 5,943,655 A * 8/1999 Jacobson ............... G06Q 40/12
705/30
6,012,048 A * 1/2000 Gustin .................. G06Q 20/04
109/24.1
(Continued)

FOREIGN PATENT DOCUMENTS

JP   S63-030994 A   2/1988
JP   S63-196976 A   8/1988
(Continued)

OTHER PUBLICATIONS

Nobu, Card no Kaigai Riyoji wa, Kansan Rate ni Chui! Noburogu, [online], Sep. 6, 2011 (Sep. 6, 2011) [retrieval date Jun. 24, 2016 (Jun. 24, 2016)], Internet: <URL: http://dunzhi.at.webry.info/201109/article_1.html>, lines 1 to 28.

*Primary Examiner* — Tuyen K Vo
(74) *Attorney, Agent, or Firm* — Rabin & Berdo, P.C.

(57) ABSTRACT

A transaction device is provided for (1) paying in and paying out a first currency. The transaction device includes (2) a display section to display transaction content, and a transaction processing section to perform a transaction using the display section and an inserted medium. (3) In cases in which a second currency corresponding to the medium is to be used to perform a pay-out transaction in the first currency, the transaction processing section performs settlement selection processing to receive selection of whether to use a settlement rate at the time of payout or a settlement rate subsequent thereto as an exchange rate between the first currency and the second currency.

16 Claims, 17 Drawing Sheets

(51) Int. Cl.
*G07D 9/00* (2006.01)
*G07D 13/00* (2006.01)
*G07F 19/00* (2006.01)
*G06Q 20/38* (2012.01)

(52) U.S. Cl.
CPC ............ *G07F 19/20* (2013.01); *G07F 19/202* (2013.01); *G07F 19/203* (2013.01)

(56) References Cited

U.S. PATENT DOCUMENTS

| | | | |
|---|---|---|---|
| 7,458,507 B2* | 12/2008 | Fillinger | G06Q 20/108 235/379 |
| 7,734,545 B1* | 6/2010 | Fogliano | G06Q 20/04 705/40 |
| 2002/0179401 A1* | 12/2002 | Knox | G06Q 20/28 194/217 |
| 2005/0015331 A1* | 1/2005 | Kunugi | G06Q 20/10 705/39 |
| 2006/0060646 A1* | 3/2006 | Lee | G06Q 20/04 235/379 |
| 2006/0069642 A1* | 3/2006 | Doran | G06Q 20/10 705/39 |
| 2007/0228150 A1* | 10/2007 | Fillinger | G06Q 20/108 235/379 |
| 2009/0063316 A1* | 3/2009 | Travis | G06Q 40/00 705/35 |
| 2009/0063344 A1* | 3/2009 | Travis | G06Q 20/1085 705/43 |
| 2012/0036063 A1 | 2/2012 | Sivapathasundram et al. | |
| 2013/0151418 A1* | 6/2013 | Licciardello | G06Q 20/02 705/72 |
| 2014/0372300 A1* | 12/2014 | Blythe | G06Q 20/3676 705/41 |

FOREIGN PATENT DOCUMENTS

| | | |
|---|---|---|
| JP | H11-144122 A | 5/1999 |
| JP | 2008-305100 A | 12/2008 |
| JP | 2011-513869 A | 4/2011 |

* cited by examiner

FIG.6

```
PAYOUT 2016.01.20   13:00
```

PAYOUT AMOUNT: 30,000 YEN
SETTLEMENT AMOUNT: 200 DOLLARS

TODAY DCC SETTLEMENT RATE:
1 DOLLAR => 150 YEN

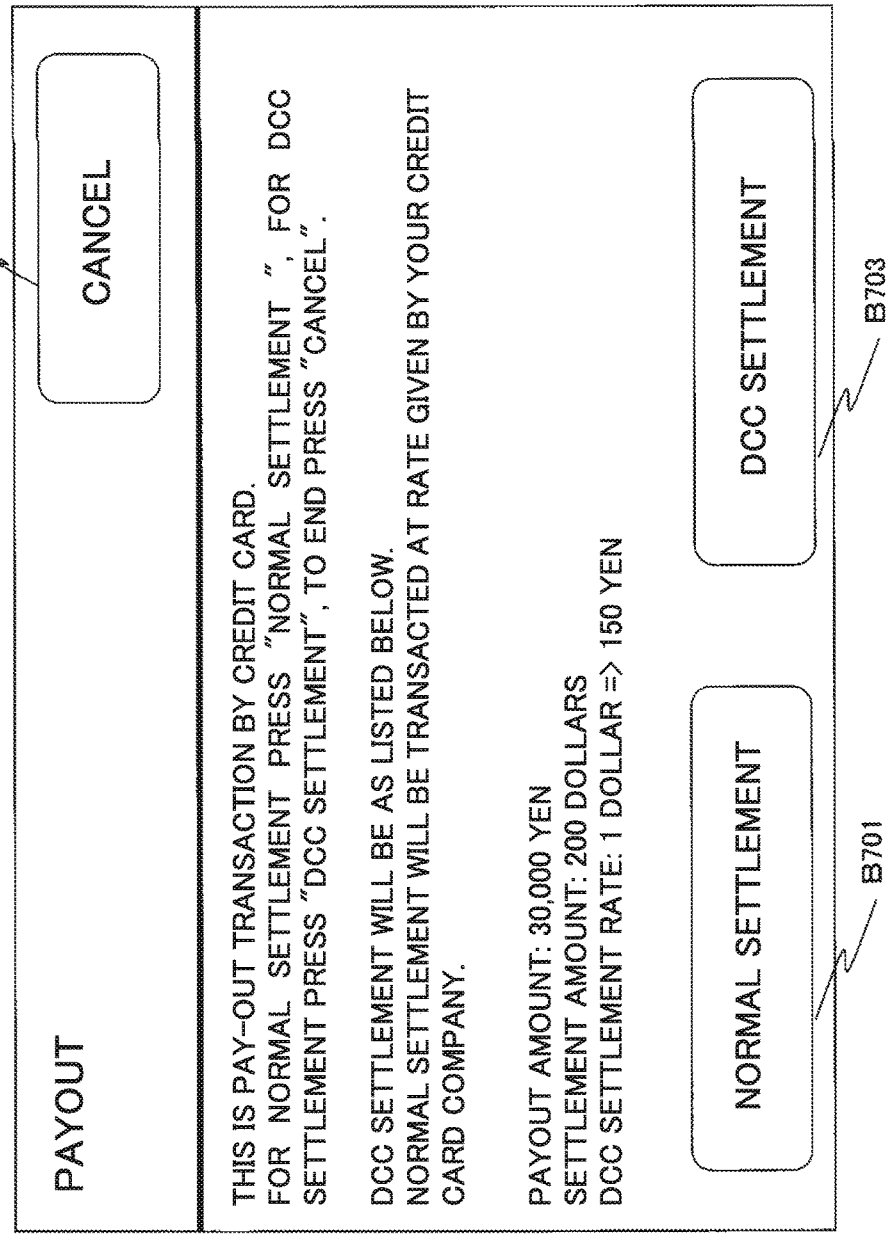

TRANSACTION DEVICE

TECHNICAL FIELD

The present disclosure relates to a transaction device applicable, for example, to an automatic teller machine (ATM) that is installed in a financial institution or the like and is compatible with a cashing service using a credit card.

BACKGROUND ART

ATMs are generally configured so as to handle only the transaction currency that is the currency of the country in which they are installed.

For example, when a user from overseas executes a pay-out transaction using a credit card, the ATM will pay out currency of the country the ATM is installed in. The user then, at a later date, pays a settlement amount converted into their home currency at a settlement rate at the time of credit card billing amount finalization.

The convenience of an ATM for a user from overseas is improved if proceedings can be based on their own familiar home currency at the time of a pay-out transaction. There is accordingly technology to execute transactions with a user in which the transaction amount is expressed as an amount converted into a specified currency (see Japanese Patent Application Laid-Open (JP-A) No. H11-144122).

SUMMARY OF INVENTION

Technical Problem

However, although the technology described in JP-A No. H11-144122 contributes to an improvement in convenience, it is not technology to fix a settlement amount converted as a rate at the current point in time. Namely, there is still the possibility that a user will, at a later date, pay an unintended settlement amount due to paying a settlement amount converted at a rate at the time of credit card billing amount finalization.

A transaction device is accordingly desired that is capable of preventing a situation from arising in which an unintended payment amount arises after a pay-out transaction has been performed.

Solution to Problem

A first aspect of the present disclosure is a transaction device for paying in and paying out a first currency. The transaction device includes a display section to display transaction content, and a transaction processing section to perform a transaction using the display section and an inserted medium. In cases in which a second currency corresponding to the medium is to be used to perform a pay-out transaction in the first currency, the transaction processing section performs settlement selection processing to receive selection of whether to use a settlement rate at the time of payout or a settlement rate subsequent thereto, as an exchange rate between the first currency and the second currency.

A second aspect of the present disclosure is the transaction device of the first aspect, wherein the settlement rate subsequent thereto is a settlement rate at the point in time when medium settlement is made.

A third aspect of the present disclosure is the transaction device of the first or second aspect, further including a second currency information acquisition section. In the third aspect, in cases in which settlement is to be performed at the settlement rate at the time of payout, the second currency information acquisition section communicates with an external device managing the transaction device, and acquires second currency settlement information including a settlement rate having an exchange rate determined between the first currency and the second currency.

A fourth aspect of the present disclosure is the transaction device of one of the first to third aspects, further including a second currency information acquisition section. In the fourth aspect, in cases in which settlement is to be performed at a settlement rate at the time of payout, the second currency information acquisition section communicates with an external device managing the transaction device, and acquires second currency settlement information including a settlement rate having an exchange rate determined between the first currency and the second currency.

A fifth aspect of the present disclosure is the transaction device of the third aspect, wherein the transaction processing section communicates with the external device and inquires whether or not settlement in the second currency is available, and performs the settlement selection processing according to a result of the inquiry.

A sixth aspect of the present disclosure is the transaction device of one of the third to fifth aspects, wherein in cases in which settlement is to be performed in the second currency, the transaction processing section performs second currency settlement confirmation processing to display on the display section the second currency settlement information acquired by the second currency information acquisition section, and to receive selection of whether or not to approve a transaction according to content displayed.

A seventh aspect of the present disclosure is the transaction device of the sixth aspect, further including a statement issuing section that prints content of a transaction to issue as a receipt. In the seventh aspect, in cases in which settlement in the second currency has been approved according to content displayed by the second currency settlement confirmation processing, the transaction processing section controls so as to use the statement issuing section to print a payout amount, a settlement amount in the second currency, and a settlement rate.

An eighth aspect of the present disclosure is the transaction device of one of the third to seventh aspects, wherein when power to the transaction device has been switched ON, the transaction processing section performs processing to use the second currency information acquisition section to acquire second currency settlement information and to store the acquired second currency settlement information in a storage section. In the eighth aspect, in cases in which settlement is to be performed in the second currency, the transaction processing section uses the second currency settlement information stored in the storage section to perform a pay-out transaction.

A ninth aspect of the present disclosure is the transaction device of one of the third to eighth aspects, wherein, when the transaction device transitions from a standby state to a handling state, the transaction processing section performs processing to use the second currency information acquisition section to acquire second currency settlement information and to store the acquired second currency settlement information in a storage section. In the ninth aspect, in cases in which settlement is to be performed in the second currency, the transaction processing section performs a pay-out transaction using the second currency settlement information stored in the storage section.

A tenth aspect of the present disclosure is the transaction device of one of the third to ninth aspects, wherein when second currency settlement information has been forcibly received from the external device, the transaction processing section performs processing to store the received second currency settlement information in a storage section. In the tenth aspect, in cases in which settlement is to be performed in the second currency, the transaction processing section performs a pay-out transaction using the second currency settlement information stored in the storage section.

An eleventh aspect of the present disclosure is the transaction device of one of the third to tenth aspects, wherein when imparted with second currency settlement information by an external storage terminal, the transaction processing section performs processing to store the imparted second currency settlement information in a storage section. In the eleventh aspect, in cases in which settlement is to be performed in the second currency, the transaction processing section performs a pay-out transaction using the second currency settlement information stored in the storage section.

Advantageous Effects

According to the present disclosure, a situation can be prevented in which, when a pay-out transaction is performed, a user has an unintended payment amount.

BRIEF DESCRIPTION OF DRAWINGS

FIG. 6 is an explanatory diagram illustrating an example (first example) of a configuration of a receipt printed according to the first exemplary embodiment.

FIG. 20 is an explanatory diagram illustrating an example of a configuration of a DCC selection screen (with DCC settlement information) displayed on an ATM (operation display section) according to another exemplary embodiment.

DESCRIPTION OF EMBODIMENTS (A) First Exemplary Embodiment

Detailed description follows regarding a first exemplary embodiment of a transaction device according to the present disclosure, with reference to the drawings. In this exemplary embodiment, the transaction device of the present disclosure will be described as an example in which application is made to an ATM.

(A-1) First Exemplary Embodiment Configuration

Figure 1:
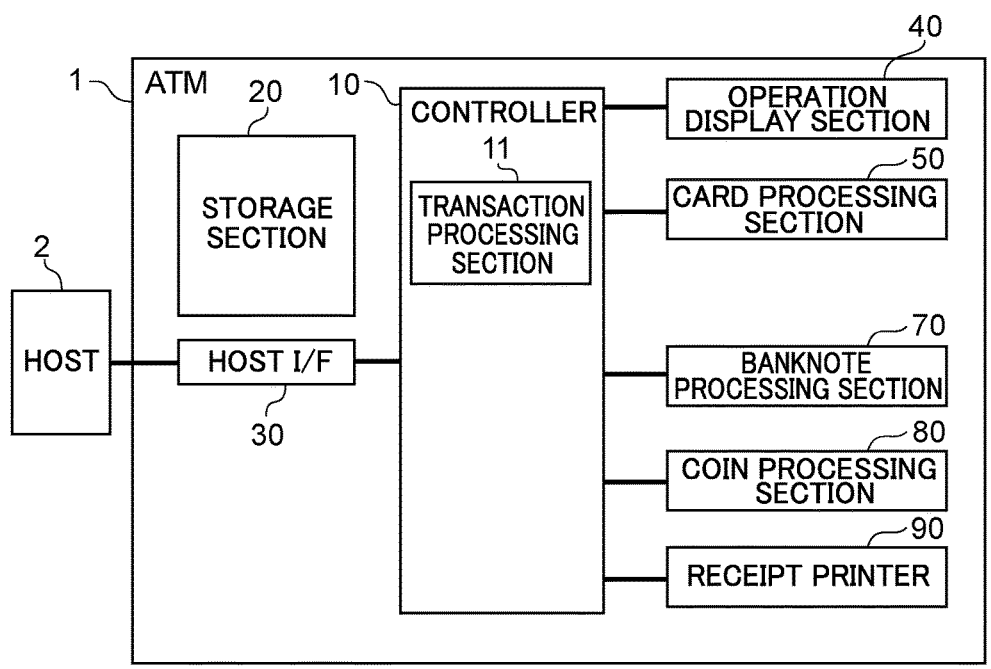
FIG. 1 is a block diagram illustrating a functional configuration of an ATM according to a first exemplary embodiment.

FIG. 1 is a block diagram illustrating an overall configuration of an ATM 1 of this exemplary embodiment.

Detailed description follows regarding the exemplary embodiment of the present disclosure, with reference to the drawings.

Figure 2:
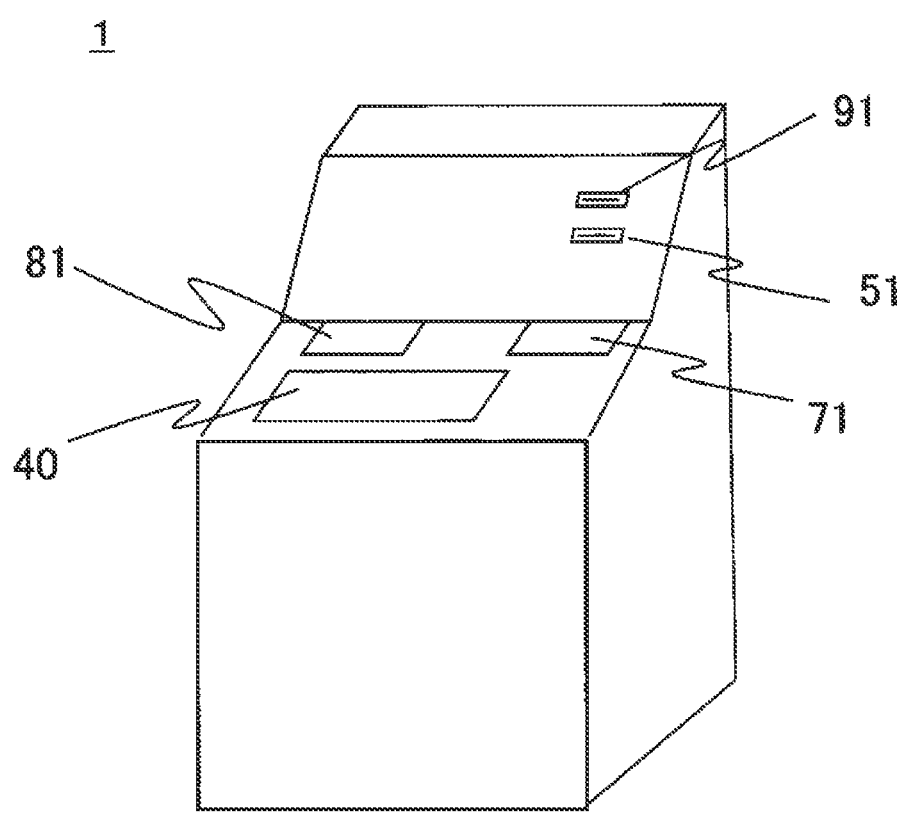
FIG. 2 is a perspective view illustrating the external appearance of an ATM according to the first exemplary embodiment.

FIG. 1 is a block diagram illustrating the configuration of the ATM 1 of the present exemplary embodiment. FIG. 2 is a schematic diagram illustrating the external appearance of the ATM 1 of the present exemplary embodiment.

The ATM 1 includes a controller 10, a storage section 20, a host I/F 30, an operation display section 40, a card processing section 50, a banknote processing section 70, a coin processing section 80, and a receipt printer 90.

The controller 10 performs the function of controlling the operation of each section in the ATM 1. The controller 10 may, for example, be implemented by installing a transaction program or the like of the exemplary embodiment in a program implementation configuration including a processor, a memory, and the like.

The controller 10 includes a transaction processing section 11. The transaction processing section 11 performs information processing in order to perform a transaction with a customer (including processing accompanying display of information to the customer and receipt of operations), and controls each of the configuration elements in the ATM 1 during transaction processing and the like.

The storage section 20 is a storage means to hold programs the controller 10 requires to operate, data such as parameters, and the like. A hard disk drive or non-volatile memory such as flash memory may, for example, be applied as the storage section 20.

The host I/F 30 is a network interface for the ATM 1 to communicate with a host 2 serving as an external device.

The operation display section 40, serving as a display section, performs the function of a user interface during transactions. There are no limitations to the type of device applied to the operation display section 40. The ATM 1 of the present exemplary embodiment will be described as an ATM in which a touch panel display is applied as the operation display section 40. In the ATM 1, information output to the user can be displayed and operational input from the user can be received by various screens (by a graphical user interface (GUI)) on the operation display section 40.

In response to control by the controller 10, the card processing section 50 performs processing such as taking in a card (credit card or the like) that has been inserted by a customer into a card input/output port 51, and reading recorded data on the card (magnetically recorded data, data recorded on an IC chip, or the like).

In response to control by the controller 10, the banknote processing section 70 performs processing to receive and store paid-in banknotes, and to pay out (dispense) stored banknotes. The banknote processing section 70 performs the paying in and paying out of banknotes using a banknote pay-in/pay-out port 71.

In response to control by the controller 10, the coin processing section 80 performs processing to receive and store paid in coins, and to pay out (dispense) stored coins. The coin processing section 80 performs the paying in and paying out of coins using a coin pay-in/pay-out port 81.

The receipt printer 90, serving as a statement issuing section, prints a receipt printed with the content of a transaction or the like, and dispenses the receipt from a receipt dispensing port 91.

Next, details of the processing of the transaction processing section 11 will be described.

When a pay-out transaction (cashing service) is performed with a credit card, the transaction processing section 11 performs processing to let the customer select whether or not to use multi-currency dynamic currency conversion (DCC). This DCC service is a service that anticipates that a credit card, which is a credit card being used in a country the ATM is install in but was issued overseas, is being used by a foreigner. Hereinafter, the currency of the country the paying out ATM is installed in is referred to as the "local currency". For example, if the ATM is installed in Japan, then the local currency is "yen (Japanese yen)". Moreover, the currency of the credit card issuing country (currency used for payment) is referred to as the "home currency". For example, if the credit card issuing country is the USA, then the home currency is "US dollar".

In traditional settlements, a user has not been able to ascertain the final settlement amount, as converted into their home currency, until this is fixed as the credit card billing amount. A DCC service enables the settlement amount to be fixed by user selection at a settlement rate (exchange rate) from the time of transaction. Namely, unintended payments at a later date due to exchange fluctuations can be prevented.

The transaction processing section 11 enables a settlement currency for a pay-out transaction to be selected as either the home currency, or the local currency. Settlement in the local currency is a method in which settlement is denominated in the local currency at the time of payout, and, at a later date, payment of the settlement amount is made in the home currency by conversion at a settlement (exchange) rate subsequently fixed. On the other hand, settlement in the home currency is a method to pay a settlement amount fixed by a settlement rate at the time of payout (corresponding to the DCC service described above). In practice, these payment methods can be looked on as being methods to make payment in the home currency at a settlement rate converted at a given point in time of either the settlement rate at the time of payout, or a settlement rate at a point in time after the time of payout (for example, a settlement rate at the time of billing).

When a customer has used the operation display section 40 to select a pay-out transaction using a credit card (cashing service), the transaction processing section 11 confirms the credit card issuing country. Note that there is no limitation to the method by which the transaction processing section 11 confirms the credit card issuing country, and various methods are applicable therefor. For example, the transaction processing section 11 may use the card processing section 50 to read information about the issuing country stored on a magnetic stripe or on an IC chip of the credit card, and confirm the issuing country based on the read information.

The transaction processing section 11 determines that the DCC service can be used in cases in which the issuing country of the credit card is any country other than the local country (i.e. is overseas). The transaction processing section 11 then displays a screen on the operation display section 40 to let a customer select settlement in a currency of either the local currency or the home currency (DCC settlement), and to receive the selection by the customer.

When settlement in the home currency has been selected, the transaction processing section 11 uses the host 2 to acquire information regarding the transaction amount (in local currency), the settlement rate, and the settlement amount (in home currency) (this information is hereinafter referred to as DCC settlement information). The transaction processing section 11 acquiring the DCC settlement information is an example of a second currency information acquisition section that acquires second currency settlement information including a settlement rate determining the exchange rate between a first currency (local currency) and a second currency (home currency).

The transaction processing section 11 then displays the acquired DCC settlement information on the operation display section 40, and lets the customer give final confirmation as to whether or not to proceed with the pay-out transaction. In cases in which the pay-out transaction is to be performed, after communicating with the host 2, the transaction processing section 11 controls so as to count the cash to be paid out, and to print the DCC settlement information on a receipt (statement) using the receipt printer 90. The transaction processing section 11 then returns the credit card to the customer, together with the printed receipt and the cash.

Note that cases in which the DCC service is not employed with the credit card, and cases in which the credit card cannot be used, are the same as traditional cases, and so explanation thereof is omitted.

(A-2) First Exemplary Embodiment Operation

Next, description follows regarding operation of the ATM 1 of the first exemplary embodiment having the configuration described above.

Figure 3:
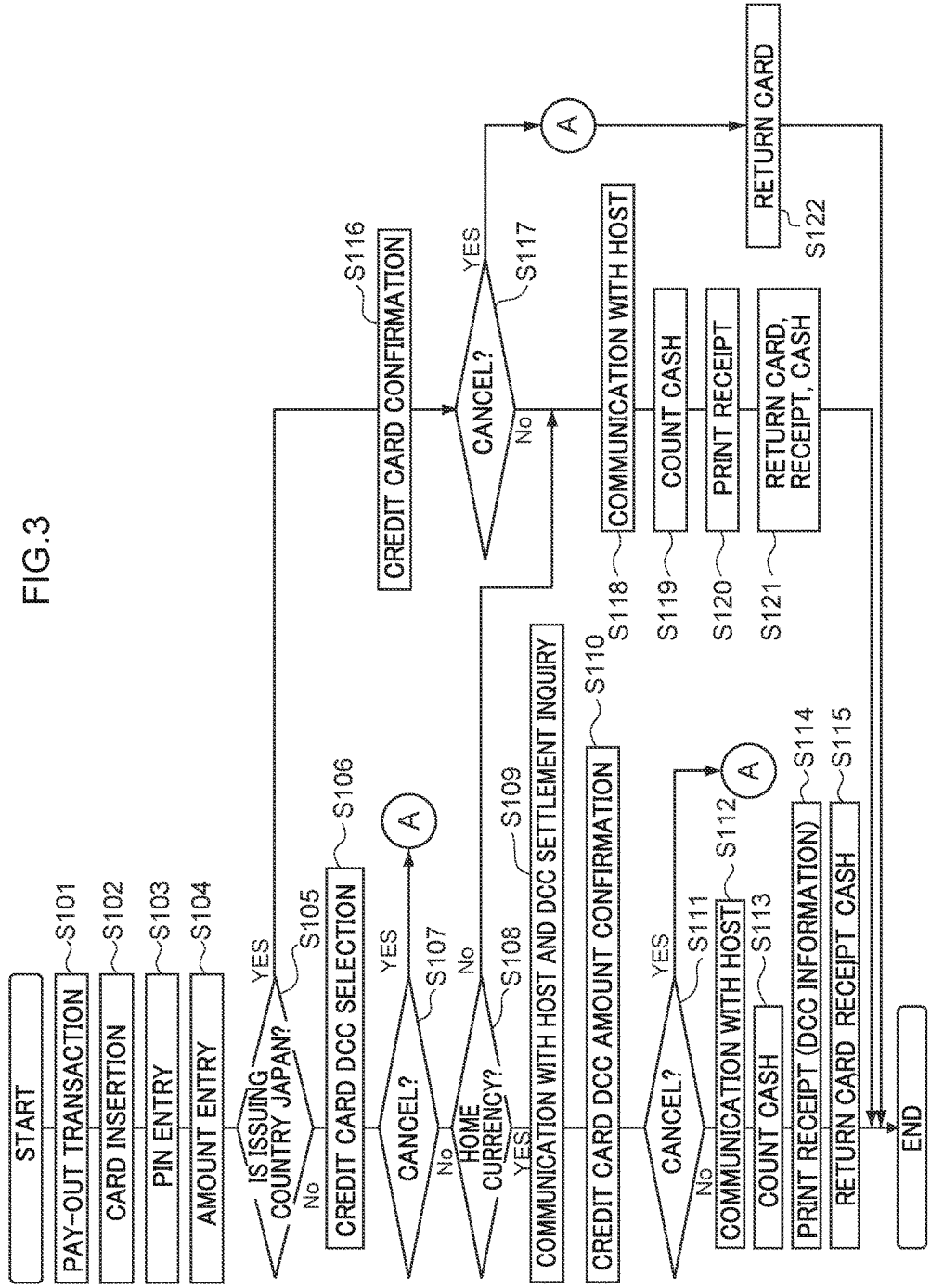
FIG. 3 is a flowchart illustrating operation when a pay-out transaction is performed with an ATM (transaction processing section) according to the first exemplary embodiment.

FIG. 3 is a flowchart illustrating operation when a pay-out transaction is performed with an ATM (transaction processing section) according to the first exemplary embodiment. Note that in the description of the present exemplary embodiment, the ATM 1 is an ATM installed in Japan, and the credit card is a credit card that was issued in the USA. Moreover, the transaction processing section 11 displays an operation screen on the operation display section 40 to receive selection of a transaction using the credit card (hereinafter referred to as a "transaction selection screen").

First, suppose that the transaction processing section 11 has received selection of a pay-out transaction (a cashing service employing a credit card) from the customer via the transaction selection screen (S101).

Then, when a credit card has been inserted into the card input/output port 51, the transaction processing section 11 displays on the operation display section 40 an operation screen to receive entry of a PIN (hereinafter referred to as a "PIN entry screen"), and receives entry of the PIN from a customer (S102, S103).

The transaction processing section 11 then displays on the operation display section 40 an operation screen to receive entry of a payout amount (transaction amount) (hereinafter referred to as "payout amount entry screen"), and receives entry of the payout amount from the customer (S104).

The transaction processing section 11 then references information about the credit card issuing country in the information on the credit card read by the card processing section 50, performs the processing of step S116, described later in cases in which the credit card was issued in Japan, and performs the following processing in cases in which the credit card was issued outside Japan (S105).

The transaction processing section 11 displays on the operation display section 40 an operation screen (hereinafter referred to as "DCC selection screen") to select whether or not to settle in the local currency (yen) or to settle in the currency of the credit card issuing country (home currency: US dollars), or to stop the transaction, and receives the settlement method that was selected by the customer (S106).

Figure 4:
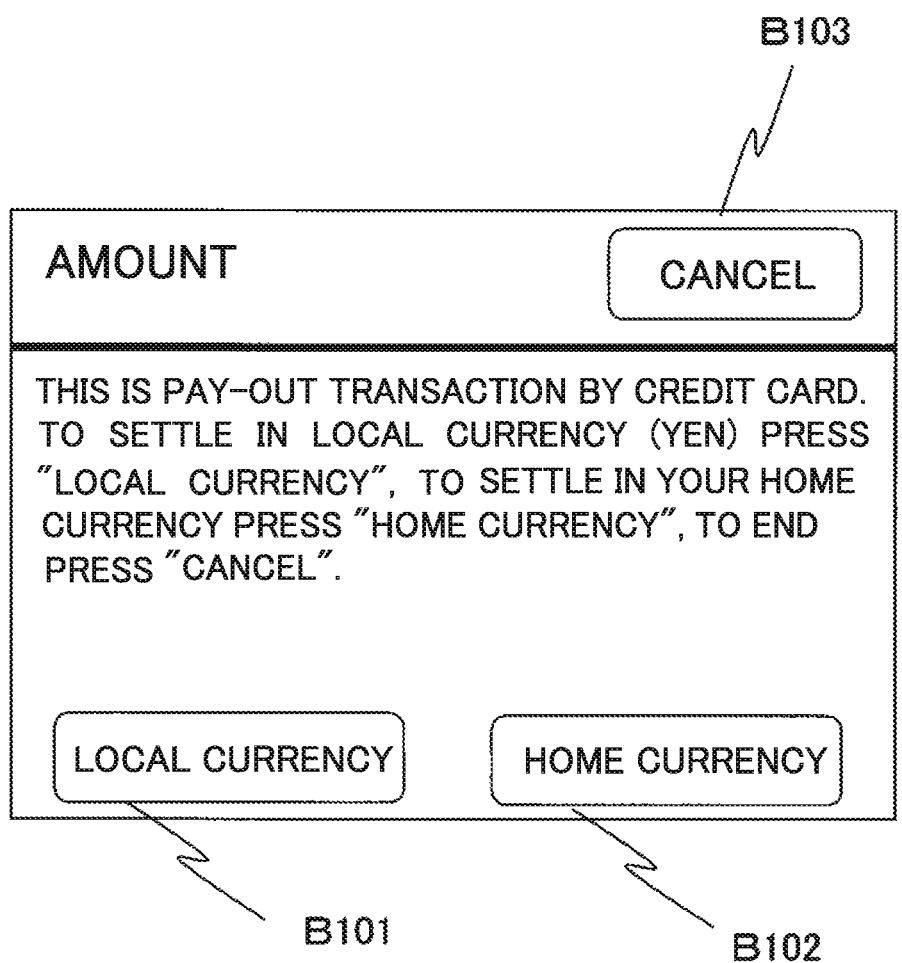
FIG. 4 is an explanatory diagram illustrating an example of a configuration of a DCC selection screen displayed with an ATM (operation display section) according to the first exemplary embodiment.

FIG. 4 is an explanatory diagram illustrating an example of a configuration of the DCC selection screen. The DCC selection screen illustrated in FIG. 4 is laid out with a local currency key B101 to receive selection to settle in the local currency (yen), a home currency key B102 to receive selection to settle in the home currency, and a cancel key B103 to receive selection to stop the transaction.

In cases in which the cancel key B103 has been pressed by the customer and the processing of the transaction is to be stopped, the transaction processing section 11 transitions to the processing of step S122, described later, or in other cases performs the following processing (S107).

In cases in which the local currency key B101 has been pressed by the customer and processing to settle in the local currency (yen) is to be performed, the transaction processing section 11 transitions to the processing of step S118, described later. In cases in which the home currency key B102 has been pressed by the customer and processing to settle in the home currency is to be performed, the transaction processing section 11 performs the following processing (S108).

In cases in which processing to settle in the home currency is to be performed, the transaction processing section 11 appends information about the intention for DCC settlement, and transmits this information in communication with the host 2 (S109). The transaction processing section 11 (ATM 1) then receives, from the host 2, a transaction amount (local country: yen), and information regarding a settlement rate and a settlement amount (home currency) (DCC settlement information).

The transaction processing section 11 displays, on the operation display section 40, a screen to display DCC settlement information received from the host 2 and to select whether or not to approve the transaction or stop the transaction (hereinafter referred to as "DCC amount confirmation screen"), and receives selection from the customer as to whether or not to approve the transaction or to stop the transaction (S110).

Figure 5:
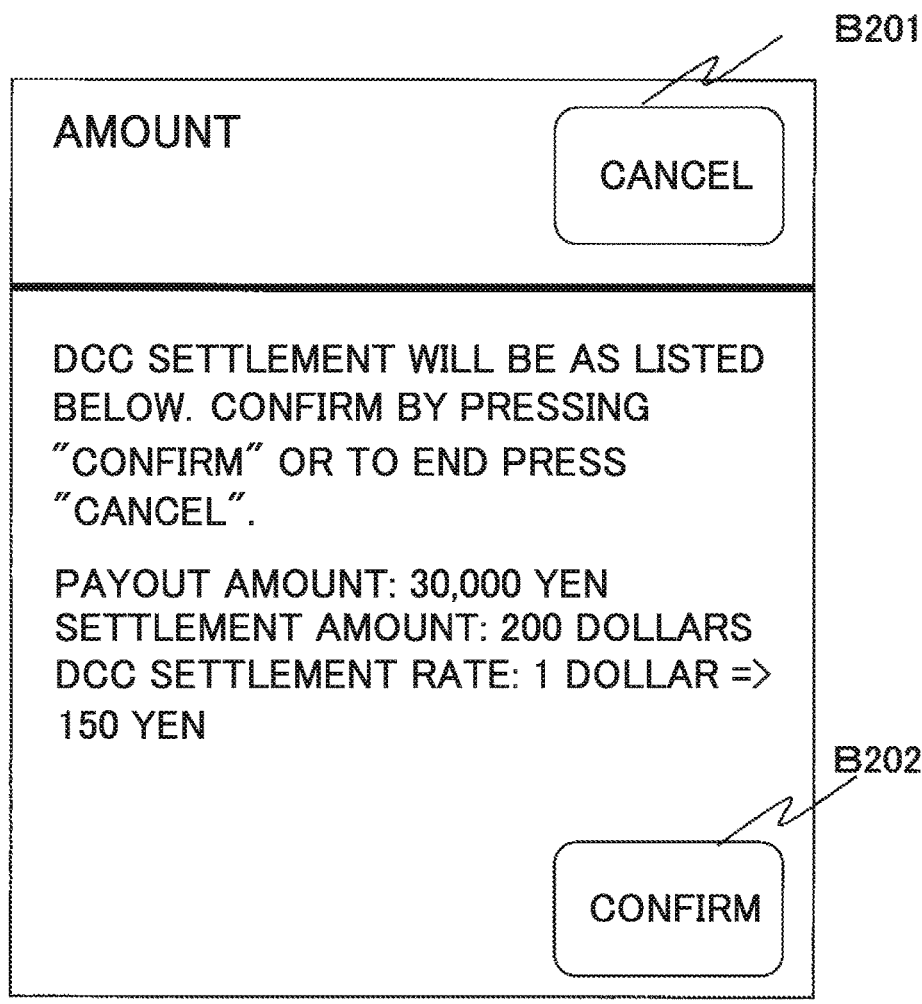
FIG. 5 is an explanatory diagram illustrating an example of a configuration of a DCC amount confirmation screen displayed with an ATM (operation display section) according to the first exemplary embodiment.

FIG. 5 is an explanatory diagram illustrating an example of a configuration of the DCC amount confirmation screen. The DCC amount confirmation screen illustrated in FIG. 5 is laid out with a confirmation key B202 to fix a transaction on the basis of the content of the DCC settlement information displayed on the screen, and a cancel key B201 to receive selection to stop the transaction.

In cases in which the cancel key B201 has been pressed by the customer and processing to stop the transaction is to be performed, the transaction processing section 11 transitions to the processing of step S122, described later. In cases in which the confirmation key B202 has been pressed by the customer and processing to fix the transaction is to be performed, the transaction processing section 11 performs the following processing (S111).

The transaction processing section 11 communicates with the host 2 and fixes the pay-out transaction (S112).

After the cash to be paid out has been counted, the transaction processing section 11 performs processing to print DCC settlement information on a receipt using the receipt printer 90 (S113, S114).

The transaction processing section 11 ends the transaction after the credit card has been ejected from the card input/output port 51, the printed receipt has been ejected from the receipt dispensing port 91, and the cash has been paid out from the banknote pay-in/pay-out port 71 and the coin pay-in/pay-out port 81 (S115).

FIG. 6 is an example of a printed receipt. A DCC settlement rate is expressed in the example of FIG. 6 as a payout amount (local: yen) and a settlement amount (home currency: US dollars).

Next, description follows regarding an example of a pay-out transaction using traditional settlement (local currency settlement), i.e. not DCC settlement.

The transaction processing section 11 performs the following processing when the credit card issuing country is Japan at the processing of step S105 described above.

The transaction processing section 11 displays a screen (hereinafter referred to as a "pay-out transaction confirmation screen") on the operation display section 40 to confirm a pay-out transaction with a credit card, and receives selection by the customer as to whether to agree or stop a payment transaction (S116).

Figure 7:
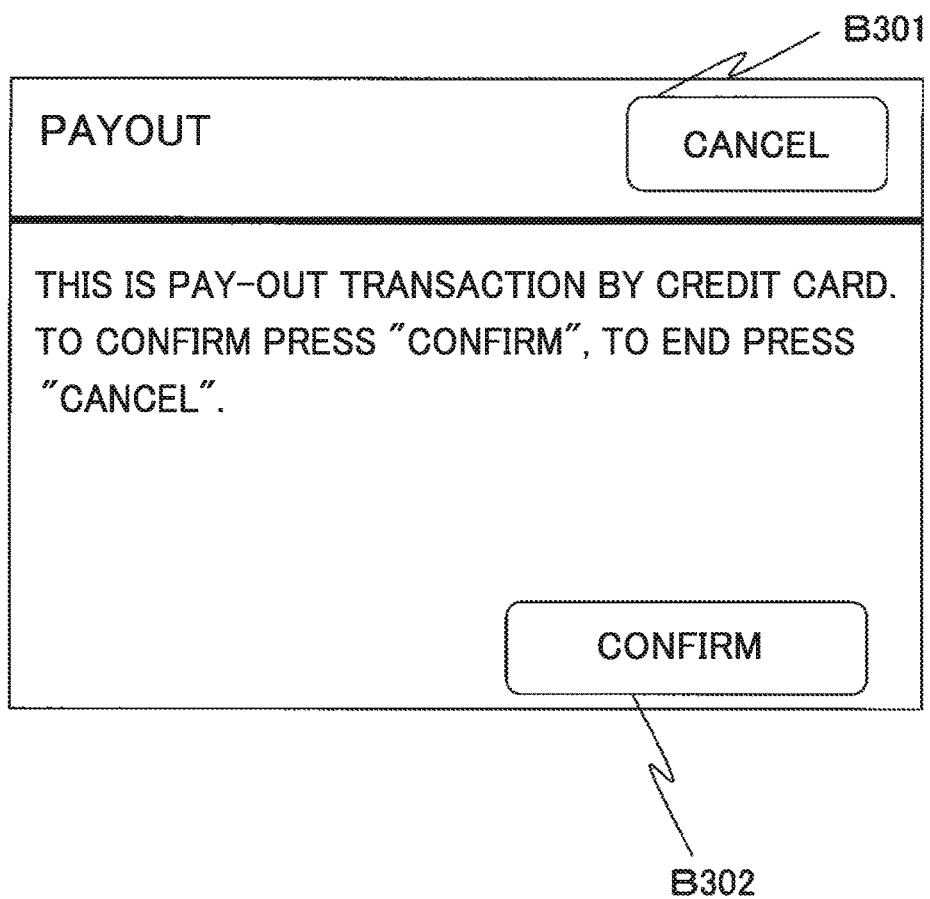
FIG. 7 is an explanatory diagram illustrating an example of a configuration of a pay-out transaction confirmation screen displayed with an ATM (operation display section) according to the first exemplary embodiment.

FIG. 7 is an explanatory diagram illustrating an example of a configuration of the pay-out transaction confirmation screen. The pay-out transaction confirmation screen illustrated in FIG. 7 is laid out with a confirmation key B302 to agree a payment transaction and a cancel key B301 to receive selection to stop the transaction.

In cases in which the transaction is to be stopped due to the cancel key B301 being pressed, the transaction processing section 11 transitions to the processing of step S122, described later. In cases in which the transaction is agreed, the transaction processing section 11 performs the following processing (S117).

The transaction processing section 11 communicates with the host 2 and fixes the pay-out transaction (S118).

After the cash to be paid out has been counted, the transaction processing section 11 performs control so as to print the payment amount information on a receipt using the receipt printer 90 (S119, S120).

The transaction processing section 11 performs control to eject the credit card from the card input/output port 51, to eject the printed receipt from the receipt dispensing port 91, and to pay out the cash from the banknote pay-in/pay-out port 71 and the coin pay-in/pay-out port 81, and then ends the pay-out transaction (S121).

Figure 8:
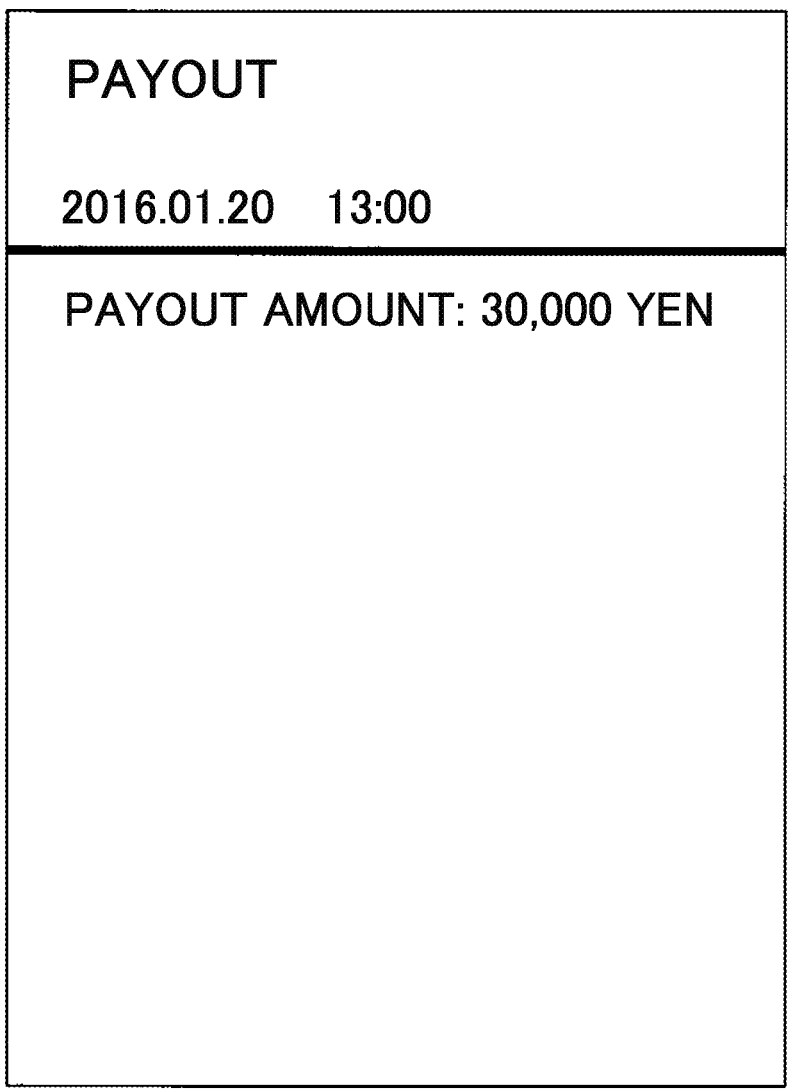
FIG. 8 is an explanatory diagram illustrating an example (second example) of a configuration of a receipt printed according to the first exemplary embodiment.

FIG. 8 is an example of a printed receipt. A payment amount (local: yen) is expressed in the example of FIG. 8.

Moreover, in cases in which determination is made at the above step S107, step S111, or step S117 to stop the transaction, the transaction processing section 11 performs control to eject the credit card from the card input/output port 51 and to end the pay-out transaction (S122).

When a pay-out transaction is performed using a credit card, the transaction processing section 11 enables a customer to select whether or not to fix a settlement amount at a settlement (exchange) rate at the time of payout, or to fix the settlement amount at a rate subsequent to the time of payout (for example, when billed for payment by the credit card issuing company). Cases in which the settlement amount is fixed at the settlement (exchange) rate at the time of payout eliminate the customer making an unintended payment at a later date since exchange fluctuation risk no longer arises.

(B) Second Exemplary Embodiment

Detailed description follows regarding a second exemplary embodiment of a transaction device according to the present disclosure, with reference to the drawings. In this exemplary embodiment, the transaction device of the present disclosure will be described as an example in which application is made to an ATM.

(B-1) Second Exemplary Embodiment Configuration

The configuration of an ATM 1 of the second exemplary embodiment can also, similarly to the first exemplary embodiment, be illustrated using FIG. 1 and FIG. 2.

In the following, description of the configuration of the ATM 1 of the second exemplary embodiment will focus on differences to in the first exemplary embodiment.

The transaction processing section 11 of the first exemplary embodiment references information included on a magnetic stripe (or IC chip) of the credit card to confirm the credit card issuing country. The transaction processing section 11 of the first exemplary embodiment then treats DCC settlement as being available in cases in which the credit card issuing country was a country other than the home country (i.e. is overseas).

In contrast thereto, the transaction processing section 11 of the second exemplary embodiment omits this processing to confirm the credit card issuing country, and instead, after letting a customer select whether or not to perform a pay-out transaction using a credit card, the transaction processing section 11 then makes an inquiry to the host 2 as to whether the credit card is able to perform DCC settlement, and confirms whether or not DCC settlement is available.

(B-2) Second Exemplary Embodiment Operation

Next, description follows regarding operation of the ATM 1 according to the second exemplary embodiment.

Figure 9:
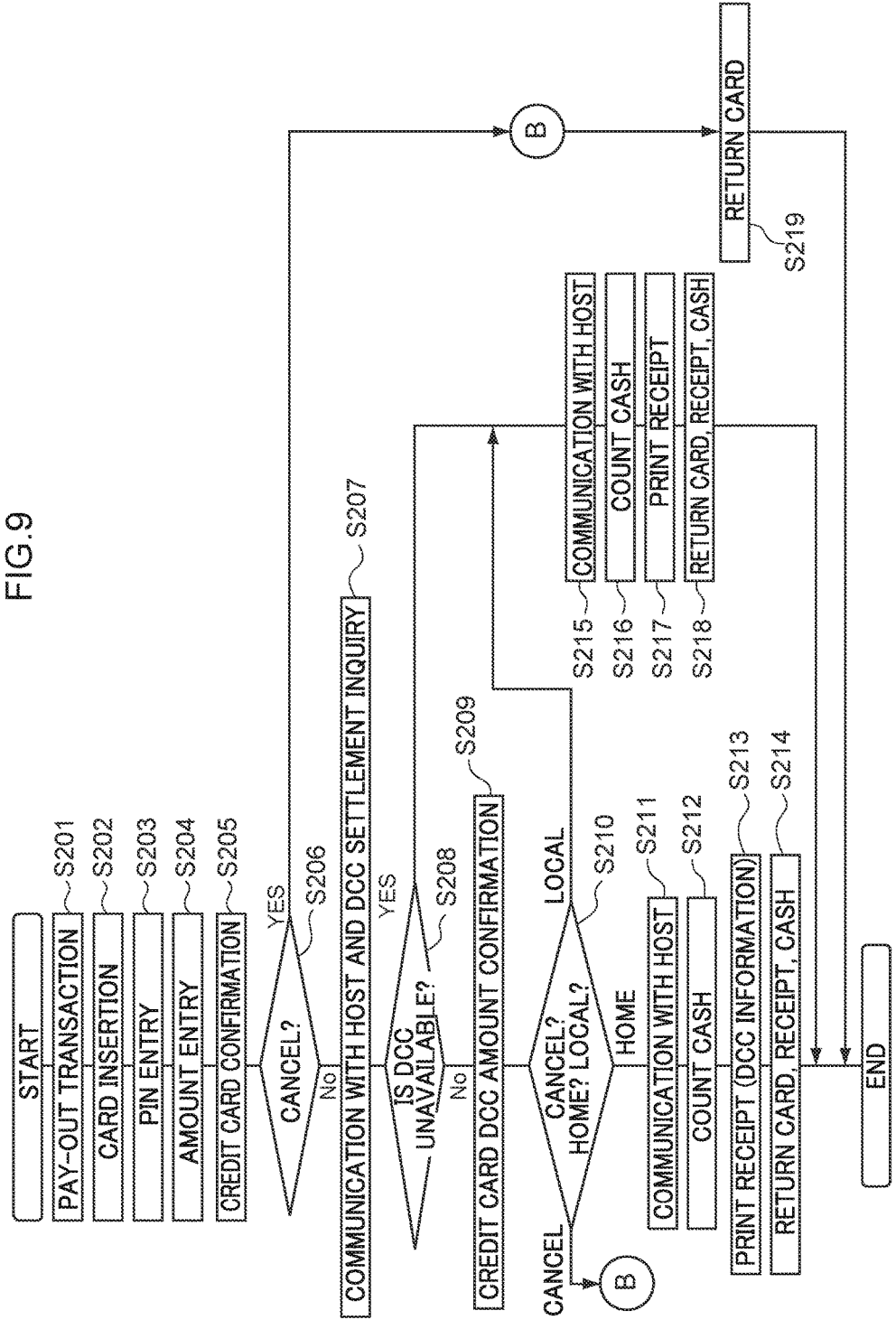
FIG. 9 is a flowchart illustrating operation when a pay-out transaction is performed with an ATM (transaction processing section) according to a second exemplary embodiment.

FIG. 9 is a flowchart illustrating operation when a pay-out transaction is performed with an ATM (transaction processing section) according to the second exemplary embodiment. In the following, description of the operation of the ATM 1 of the second exemplary embodiment will focus on differences to in the first exemplary embodiment.

First, the ATM 1 is an ATM that receives, from the customer, selection of a pay-out transaction (S201), insertion of a credit card (S202), entry of a PIN (S203), and entry of a payout amount (S204). Note that the processing of steps S201 to S204 is the same as the processing of steps S101 to S104 described above, and so detailed description thereof is omitted.

Next, the transaction processing section 11 controls the operation display section 40 so as to display the pay-out transaction confirmation screen described above (S205).

In cases in which processing to stop the transaction is to be performed due to the cancel key B301 being pressed, the transaction processing section 11 transitions to the processing of step S219, described later. In cases in which processing to confirm the transaction is to be performed (transaction continuation) due to the confirmation key B302 being pressed, the following processing is performed (S206).

The transaction processing section 11 appends information about the intention for DCC settlement and transmits this information in communication with the host 2 (S207). The transaction processing section 11 (the ATM 1) then receives DCC settlement availability information from the host 2 regarding whether or not DCC settlement is available. There is no limitation to the format of this information, and various formats are applicable therefor. For example, whether or not DCC settlement is available may be managed using a flag. Moreover, in cases in which DCC settlement is available, the transaction processing section 11 also receives, from the host 2, the transaction amount (local: yen), and information regarding the settlement rate and the settlement amount (home currency) (DCC settlement information).

The transaction processing section 11 references the DCC settlement availability information received from the host 2, and transitions to the processing of step S215, described later, when DCC settlement is not available, and performs the following processing (S208) when DCC settlement is available.

The transaction processing section 11 displays, on the operation display section 40, an operation screen to allow selection of settlement in local currency (yen), settlement in the currency of the credit card issuing country (home currency: US dollars), or stopping of the transaction (hereinafter referred to as "DCC selection screen (with DCC settlement information)"), and receives selection by the customer of the settlement method (S209).

Figure 10:
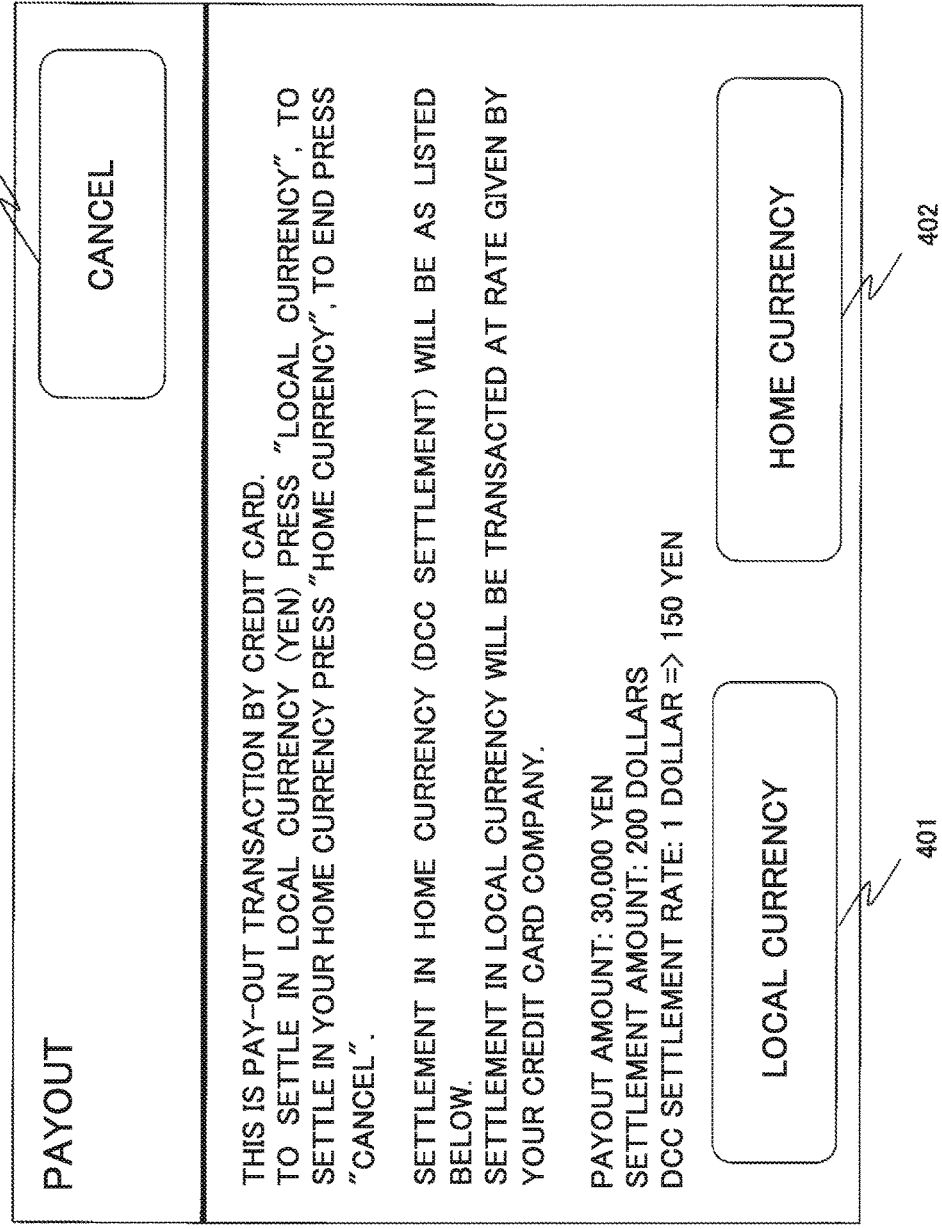
FIG. 10 is an explanatory diagram illustrating an example of a configuration of a DCC selection screen displayed with an ATM (operation display section) according to the second exemplary embodiment.

FIG. 10 is an explanatory diagram illustrating an example of a configuration of the DCC selection screen. The DCC selection screen (with DCC settlement information) illustrated in FIG. 10 is laid out with a local currency key B401 to receive selection to settle in the local currency (yen), a home currency key B402 to receive selection to settle in the home currency, and a cancel key B403 to receive selection to stop the transaction. Moreover, DCC settlement information is displayed onscreen on the DCC selection screen (with DCC settlement information) when DCC settlement is to be performed (when home currency settlement is to be performed).

The transaction processing section 11 transitions to the processing of step S219, described later, in cases in which the cancel key B403 has been pressed and the transaction processing section 11 is to perform processing to stop the transaction, processing transitions to step S215, described later, in cases in which local currency settlement is to be performed due to the local currency key B401 being pressed, and the following processing is performed in cases in which home currency settlement is to be performed due to the home currency key B402 being pressed (S210).

The transaction processing section 11 performs processing for host communication (S211), cash counting (S212), receipt printing (DCC information) (S213), and credit card, receipt, and cash return (S214). Note that due to the processing of steps S211 to S214 being processing similar to that of steps S112 to S115 described above, detailed description thereof is omitted.

Moreover, the transaction processing section 11 performs the processing of steps S215 to step S218 in cases in which DCC settlement non-availability is determined by the processing of previously described step S208, or when local currency settlement is determined in the processing of previous step S210. Note that the processing of steps S215 to step S218 is processing similar to that of steps S118 to S121 described above, and so detailed description thereof is omitted.

Moreover, in cases in which determination was made in the processing of previously described step S206 or step S210 to cancel the pay-out transaction, the transaction processing section 11 performs processing to return the credit card and ends the transaction (S219).

According to the second exemplary embodiment, the customer is able, after referencing DCC settlement information, to select on a single screen whether to settle in the home currency (DCC settlement) or to settle in the local currency. The convenience for the customer is thereby improved in comparison to in the first exemplary embodiment.

(C) Third Exemplary Embodiment

Detailed description follows regarding a third exemplary embodiment of the transaction device according to the present disclosure, with reference to the drawings. In this exemplary embodiment, the transaction device of the present disclosure will be described as an example in which application is made to an ATM.

(C-1) Third Exemplary Embodiment Configuration

The configuration of an ATM 1 of the third exemplary embodiment can also, similarly to the first exemplary embodiment, be illustrated using FIG. 1 and FIG. 2.

In the following, description of the configuration of the ATM 1 of the third exemplary embodiment will focus on differences to in the first exemplary embodiment.

In the transaction processing section 11 of the first exemplary embodiment, confirmation of the credit card issuing country was made with reference to information included in a magnetic stripe (or IC chip) of the credit card. The transaction processing section 11 of the first exemplary embodiment treats DCC settlement as being available in cases in which the credit card issuing country is not the home country (i.e. is overseas).

However, the transaction processing section 11 of the second exemplary embodiment omits this processing to confirm the credit card issuing country, and instead, after letting a customer select whether or not to use DCC settlement to perform a pay-out transaction using a credit card, the transaction processing section 11 then makes an inquiry to the host 2 as to whether the credit card is able to perform DCC settlement, and confirms whether or not DCC settlement is available.

(C-2) Third Exemplary Embodiment Operation

Explanation follows regarding operation of the ATM 1 according to the third exemplary embodiment.

Figure 11:
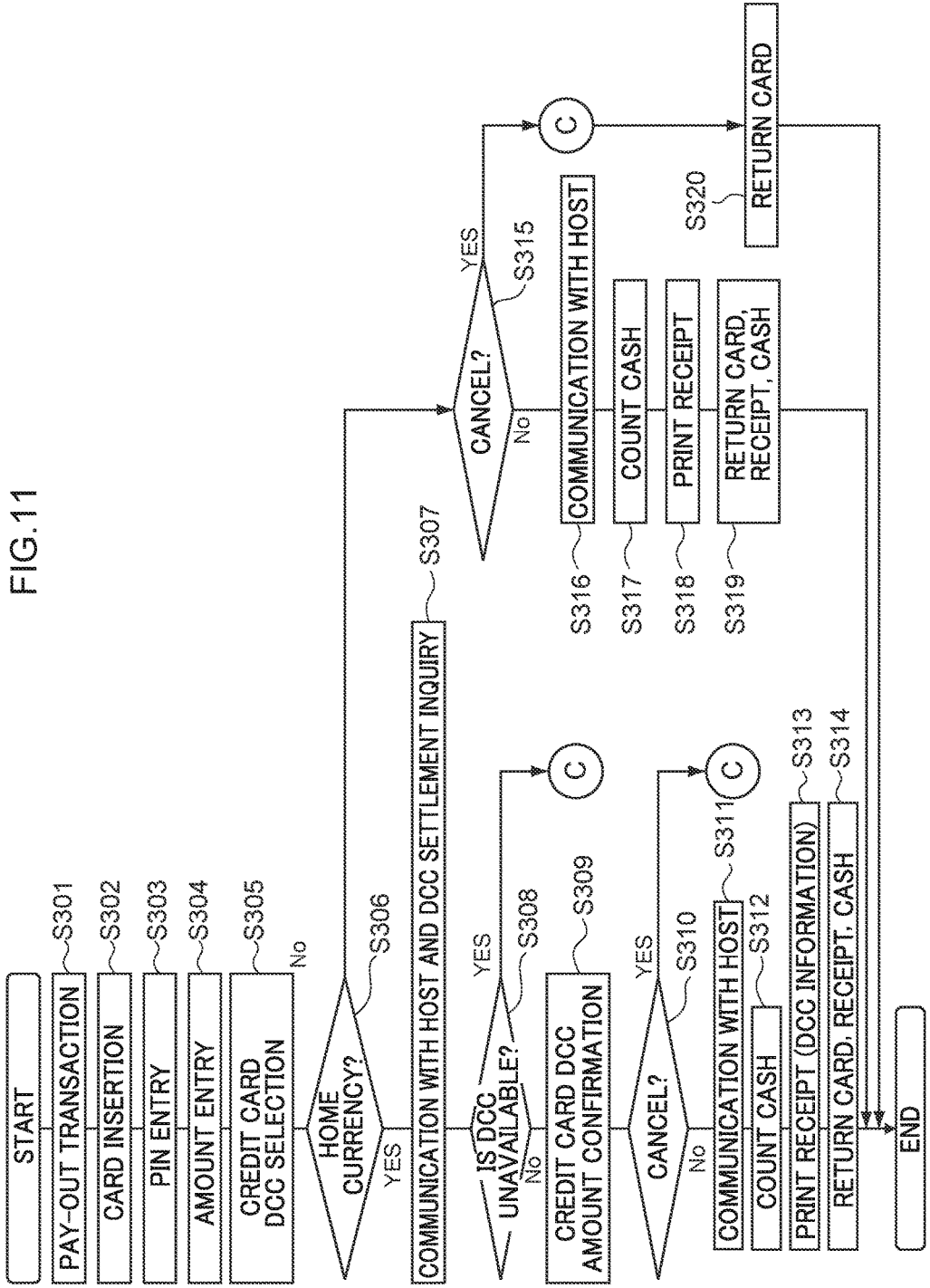
FIG. 11 is a flowchart illustrating operation when a pay-out transaction is performed with an ATM (transaction processing section) according to a third exemplary embodiment.

FIG. 11 is a flowchart illustrating operation to perform a pay-out transaction in an ATM (transaction processing section) according to the third exemplary embodiment. In the following, description of the configuration of the operation of the ATM 1 of the third exemplary embodiment will focus on differences to in the first exemplary embodiment.

First, suppose the ATM 1 has received, from a customer, selection of a pay-out transaction (S301), insertion of a credit card (S302), entry of a PIN (S303), and entry of a payout amount (S304). Note, the processing of steps S301 to step S304 is similar to the processing of steps S101 to S104 described above, and so detailed description thereof is omitted.

The transaction processing section 11 then displays the DCC selection screen described above on the operation display section 40, and receives selection of the settlement method from the customer (S305).

The transaction processing section 11 performs the following processing in cases in which a home currency key B102 is pressed by the customer and processing to settle in the home currency is to be performed (S307), and in other cases transitions to the processing of step S315, described later (S306).

The transaction processing section 11 performs a DCC settlement inquiry to determine whether or not DCC settlement is available (S307, S308). Note that the processing of steps S307, S308 is similar to the processing of steps S207, S208 described above, and so detailed description thereof is omitted.

Moreover, the processing of steps S309 to S314, described later, is processing similar to the processing of steps S110 to S115 described above, and so detailed description thereof is omitted.

In cases in which determination is made by the processing of step S306 described above that the settlement method is other than in the home currency, the transaction processing section 11 performs the following processing.

The transaction processing section 11 transitions to the processing of step S320, described later, in cases in which processing to stop the transaction is to be performed, and in other cases (settlement by local currency) performs the following processing (S315).

The transaction processing section 11 performs processing to communicate with a host (S316), to count cash (S317), to print a receipt (S318), and to return a credit card, receipt, and cash (S319). Note that the processing of steps S316 to S319 is similar to the processing of steps S118 to S121 described above, and so detailed description thereof is omitted.

In cases in which determination is made by the processing of step S315 described above to cancel the pay-out transaction, the transaction processing section 11 performs processing to return the credit card, and ends the transaction (S320).

The third exemplary embodiment omits the check of the credit card issuing country, which is always performed in the first exemplary embodiment, and only enquires about DCC settlement availability in cases in which DCC settlement has been selected by the customer, enabling the throughput of the ATM 1 (the transaction processing section 11) to be optimized.

(D-1) Fourth Exemplary Embodiment Configuration

The configuration of an ATM 1 of the fourth exemplary embodiment can also, similarly to the first exemplary embodiment, be illustrated using FIG. 1 and FIG. 2.

In the following, description of the configuration of the ATM 1 of the fourth exemplary embodiment will focus on differences to in the first exemplary embodiment.

In the first to the third exemplary embodiments, DCC settlement required information was acquired from the host 2 by the transaction processing section 11 at each pay-out transaction. In the fourth exemplary embodiment, the transaction processing section 11 differs from the first to the third exemplary embodiments in the point that DCC settlement required information is acquired in advance and stored internally (in a storage section 20). The transaction processing section 11 of the fourth exemplary embodiment references DCC settlement required information from the storage section 20 at each pay-out transaction.

The transaction processing section 11 of the fourth exemplary embodiment acquires the DCC settlement required information from the host 2 in advance when the power (power source) for the ATM 1 is switched ON. The transaction processing section 11 stores, in the storage section 20, the DCC settlement rate (exchange rate) acquired from the host 2 and information about the currencies handled. For example, information is stored indicating that the Japanese yen in US dollar currency is 150 yen to 1 US dollar. Note that this information is stored in the storage section 20 for each currency handled.

(D-2) Fourth Exemplary Embodiment Operation

Explanation follows regarding operation of an ATM 1 according to the fourth exemplary embodiment.

Figure 12:
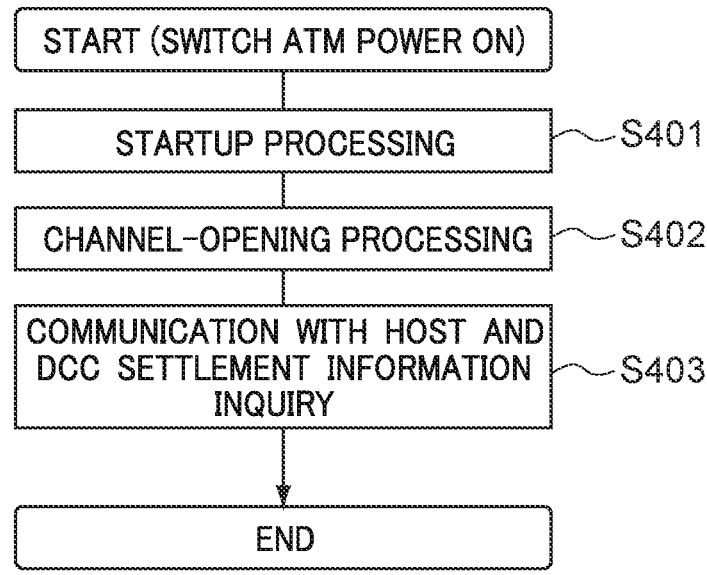
FIG. 12 is a flowchart illustrating an operation (DCC settlement information acquisition) prior to performing a pay-out transaction with an ATM (transaction processing section) according to a fourth exemplary embodiment.

FIG. 12 is a flowchart illustrating an operation (DCC settlement information acquisition) performed prior to a pay-out transaction in an ATM (transaction processing section) according to the fourth exemplary embodiment. In the following, description of the configuration of the operation of the ATM 1 of the fourth exemplary embodiment will focus on differences to in the first exemplary embodiment.

The controller 10 performs start-up processing (OS startup processing and the like) when the power to the ATM 1 is switched ON (S401).

The transaction processing section 11 then performs channel-opening processing to establish a network connection between the ATM 1 and the host 2 (S402).

The transaction processing section 11 then communicates with the host 2 and acquires DCC settlement required information (the exchange rate to be used in DCC settlement and information about currencies handled) (S403). The acquired DCC settlement required information is then stored in the storage section 20.

The pay-out transaction that follows is, for example, executed by processing according to the flowchart of FIG. 3. However, at the processing of step S109 of FIG. 3, the transaction processing section 11 acquires the DCC settlement information from the storage section 20 instead of acquiring it from the host 2. Processing other than this is similar to the processing illustrated in the flowchart of FIG. 3, and so description thereof is omitted.

In the fourth exemplary embodiment, the ATM 1 acquires the exchange rate required for DCC settlement and information of the currencies that can be handled in advance and all at once from the host 2, and stores this information internally (in the storage section 20). The transaction processing section 11 is thereby able to reference the DCC settlement required information from the storage section 20 for each pay-out transaction. In other words, there is no longer a need for the transaction processing section 11 to perform communication with the host 2 for each transaction, enabling a higher network efficiency to be achieved than in the first exemplary embodiment.

(E) Fifth Exemplary Embodiment

Detailed description follows regarding a fifth exemplary embodiment of a transaction device according to the present disclosure, with reference to the drawings. In this exemplary embodiment, the transaction device of the present disclosure will be described as an example in which application is made to an ATM.

(E-1) Fifth Exemplary Embodiment Configuration

The configuration of an ATM 1 of the fifth exemplary embodiment can also, similarly to the fourth exemplary embodiment, be illustrated using FIG. 1 and FIG. 2.

In the following, description of the configuration of the ATM 1 of the fifth exemplary embodiment will focus on differences to in the fourth exemplary embodiment.

In the transaction processing section 11 of the fourth exemplary embodiment, DCC settlement required information is acquired from the host 2 when power is switched ON. However, the transaction processing section 11 of the fifth exemplary embodiment differs in the point that the DCC settlement required information is acquired by the channel-opening processing executed when the ATM 1 transitions from a service standby state to a handling state. This service standby state occurs, for example, when a maintenance operative is performing an operation to replace cash.

(E-2) Fifth Exemplary Embodiment Operation

Next, description follows regarding operation of the ATM 1 according to the fifth exemplary embodiment.

Figure 13:
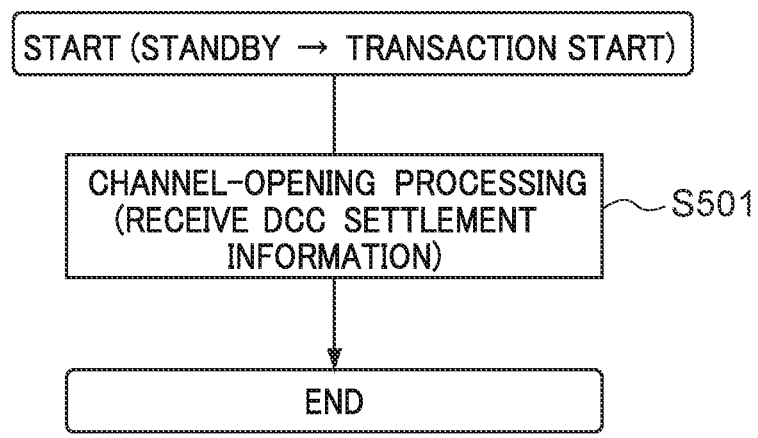
FIG. 13 is a flowchart illustrating an operation (DCC settlement information acquisition) prior to performing a pay-out transaction with an ATM (transaction processing section) according to a fifth exemplary embodiment.

FIG. 13 is a flowchart illustrating an operation (DCC settlement information acquisition) prior to a pay-out transaction with an ATM (transaction processing section) according to the fifth exemplary embodiment. Description follows regarding operation of the ATM 1 according to the fifth exemplary embodiment, focusing on differences to in the first exemplary embodiment.

The transaction processing section 11 performs channel-opening processing to establish a network connection between the host 2 and the ATM 1 when the ATM 1 has transitioned from a standby state to a handling state (S401).

The transaction processing section 11 then acquires the DCC settlement required information (exchange rate to be used in DCC settlement and information about currencies handled) from the host 2. The acquired DCC settlement required information is stored in the storage section 20.

The pay-out transaction that follows is executed by, for example, processing according to the flowchart of FIG. 3. However, at the processing of step S109 of FIG. 3, the transaction processing section 11 acquires the DCC settlement information from the storage section 20 instead of acquiring it from the host 2. Other processing is similar to the processing illustrated in the flowchart of FIG. 3, and so description thereof is omitted.

In the fifth exemplary embodiment, the exchange rate to be used in DCC settlement and information about currencies that can be handled is acquired when the ATM 1 has transitioned from a standby state to a handling enabled state. Thus, for example, DCC settlement can be performed in accordance with the latest rates even when there has been a change in exchange rates when the ATM 1 was in the standby state.

(F) Sixth Exemplary Embodiment

Detailed explanation follows regarding a sixth exemplary embodiment of a transaction device according to the present disclosure, with reference to the drawings. In this exemplary embodiment, the transaction device of the present disclosure will be described as an example in which application is made to an ATM.

(F-1) Sixth Exemplary Embodiment Configuration

The configuration of an ATM 1 of the sixth exemplary embodiment can also, similarly to the fourth exemplary embodiment, be illustrated using FIG. 1 and FIG. 2.

In the following, description of the configuration of the ATM 1 of the sixth exemplary embodiment will focus on differences to in the fourth exemplary embodiment.

In the transaction processing section 11 of the fourth exemplary embodiment, the DCC settlement required information is acquired from the host 2 when power is switched ON. On the other hand, in addition thereto (or in place thereof), the transaction processing section 11 of the sixth exemplary embodiment acquires the DCC settlement required information from the host 2 by communication (electronic text) to forcibly receive the DCC settlement required information.

(F-2) Sixth Exemplary Embodiment Operation

Next, explanation follows regarding operation of the ATM 1 according to the sixth exemplary embodiment.

Figure 14:
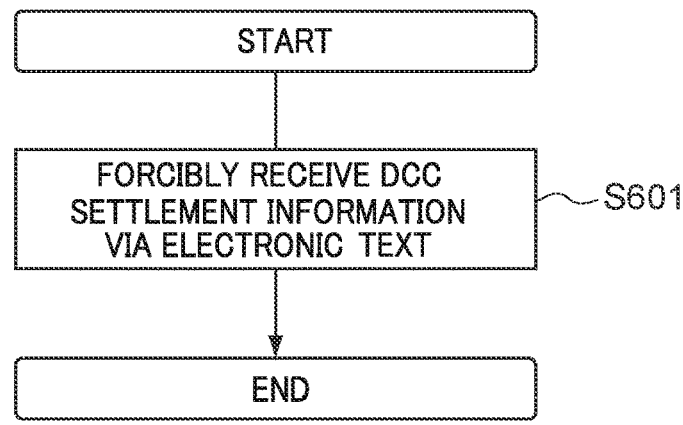
FIG. 14 is a flowchart illustrating an operation (DCC settlement information acquisition) prior to performing a pay-out transaction with an ATM (transaction processing section) according to a sixth exemplary embodiment.

FIG. 14 is a flowchart illustrating operation performed prior to a pay-out transaction in an ATM (transaction processing section) according to the sixth exemplary embodiment. In the following, description of the configuration of the operation of the ATM 1 of the sixth exemplary embodiment will focus on differences to in the first exemplary embodiment.

When the transaction processing section 11 forcibly receives the electronic text from the host 2, the transaction processing section 11 acquires the DCC settlement required information (the exchange rate to be used in DCC settlement and information about currencies handled) from the electronic text. The acquired DCC settlement required information is stored (updated) in the storage section 20.

The pay-out transaction that follows is executed by, for example, processing according to the flowchart of FIG. 3. However, at the processing of step S109 of FIG. 3, the transaction processing section 11 acquires the DCC settlement information from the storage section 20 instead of acquiring it from the host 2. Other processing is similar to the processing illustrated in the flowchart of FIG. 3, and so description thereof is omitted.

In the sixth exemplary embodiment, the ATM 1 acquires the exchange rate required for DCC settlement and information about currencies that can be handled acquired when the electronic text is forcibly acquired from the host 2. Thus, for example, DCC settlement can be performed in accordance with the latest exchange rates even when there has been a change in exchange rates while the ATM 1 is in operation.

(G) Seventh Exemplary Embodiment

Detailed explanation follows regarding a seventh exemplary embodiment of a transaction device according to the present disclosure, with reference to the drawings. In this exemplary embodiment, the transaction device of the present disclosure will be described as an example in which application is made to an ATM.

(G-1) Seventh Exemplary Embodiment Configuration

The configuration of an ATM 1 of the seventh exemplary embodiment can also, similarly to the fourth to the sixth exemplary embodiments, be illustrated using FIG. 1 and FIG. 2.

In the following, description of the configuration of the ATM 1 of the seventh exemplary embodiment will focus on differences to in the fourth to the sixth exemplary embodiments.

In the transaction processing section 11 of the fourth to the sixth exemplary embodiments, the DCC settlement required information was acquired from the host 2. The transaction processing section 11 of the seventh exemplary embodiment differs therefrom in the point that the DCC settlement required information is acquired from an external storage medium instead. Note that various media may be applied as the external storage medium, and, for example, a CD-ROM, USB memory, or the like may be employed therefor.

(G-2) Seventh Exemplary Embodiment Operation

Explanation follows regarding operation of the ATM 1 according to the seventh exemplary embodiment.

The transaction processing section 11 displays a screen (hereinafter referred to as "DCC setting UTY screen") set with the DCC settlement information (exchange rate) on a panel installed on the back face of the ATM 1, and receives registration of DCC settlement information from a maintenance operative.

Figure 15:
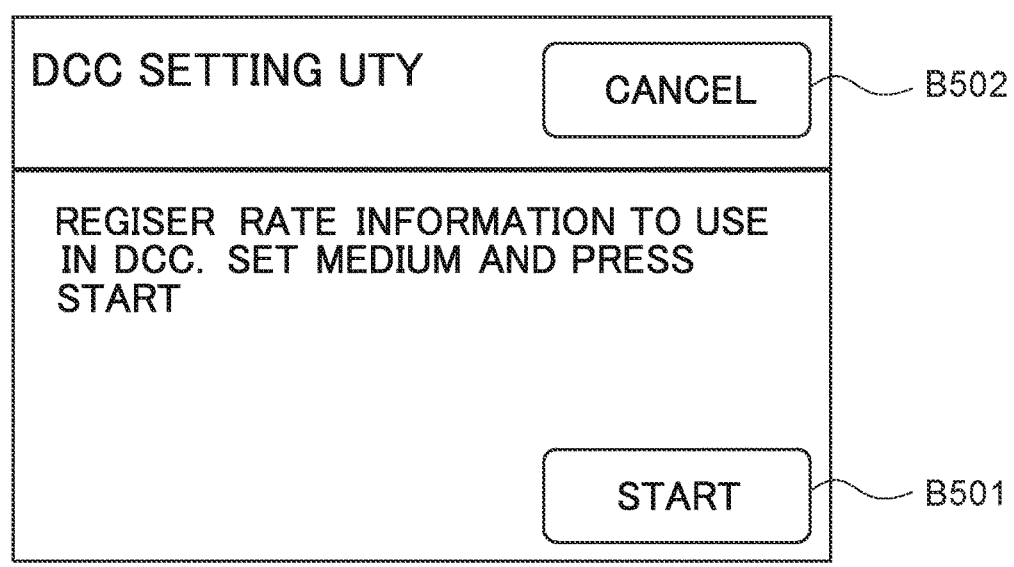
FIG. 15 is an explanatory diagram illustrating an example (a first example) of a configuration of a DCC setting UTY screen displayed on an ATM (rear face display section) according to a seventh exemplary embodiment.

FIG. 15 is an explanatory diagram to illustrate an example of configuration of a DCC setting UTY screen. The DCC setting UTY screen illustrated in FIG. 15 is laid out with a start key B501 to receive processing to read data from an external storage medium set in a predetermined position of the ATM 1, and a cancel key B502 to receive selection to stop registration of DCC settlement information.

Figure 16:
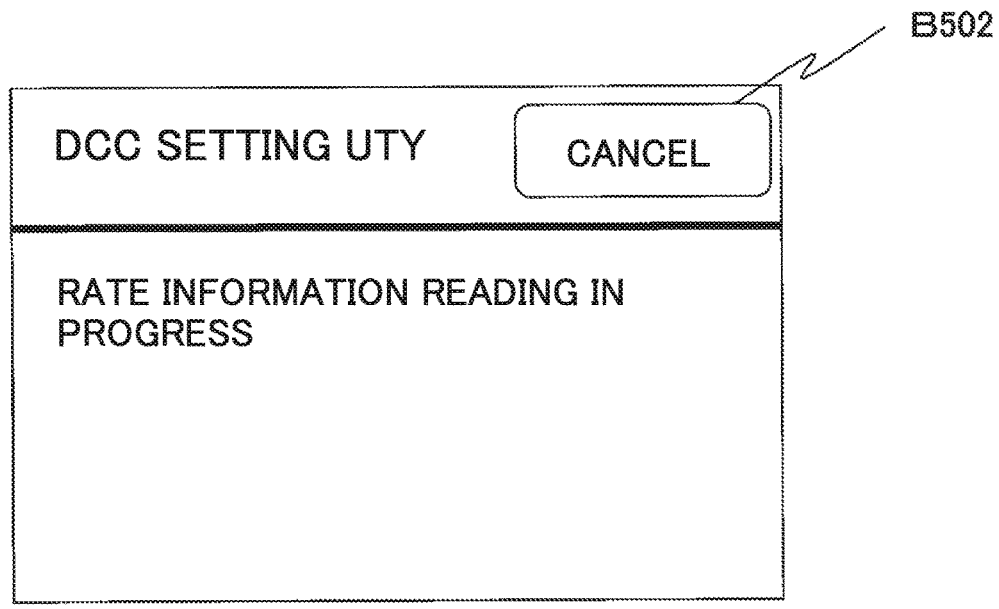
FIG. 16 is an explanatory diagram illustrating an example (a second example) of a configuration of a DCC setting UTY screen displayed on an ATM (rear face display section) according to the seventh exemplary embodiment.

In the transaction processing section 11, processing to read data from the external storage medium is started when the external storage medium has been set in the ATM 1 by the maintenance operative and the start key B501 has been pressed. The transaction processing section 11 outputs a screen, such as that illustrated in FIG. 16, while the data is being read from the external storage medium, so as to notify that reading is being performed.

Figure 17:
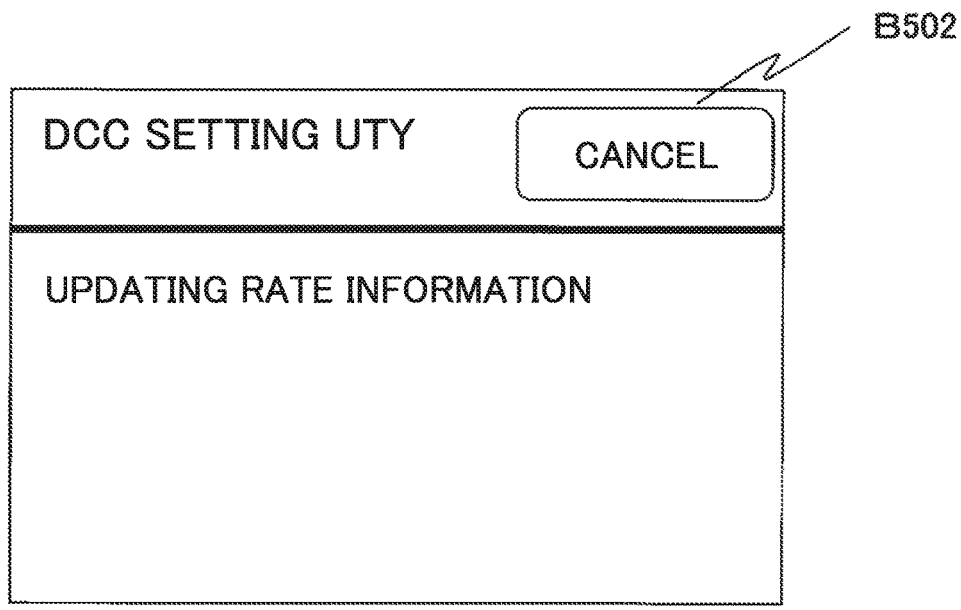
FIG. 17 is an explanatory diagram illustrating an example (a third example) of a configuration of a DCC setting UTY screen displayed on an ATM (rear face display section) according to the seventh exemplary embodiment.

The transaction processing section 11 then starts processing to store (update) the read data on the storage section 20 when the processing to read the data from the external storage medium has been completed. The transaction processing section 11 outputs a screen, such as that illustrated in FIG. 17 while the data read from the external storage medium is being updated, so as to notify that data update is in progress.

Figure 18:
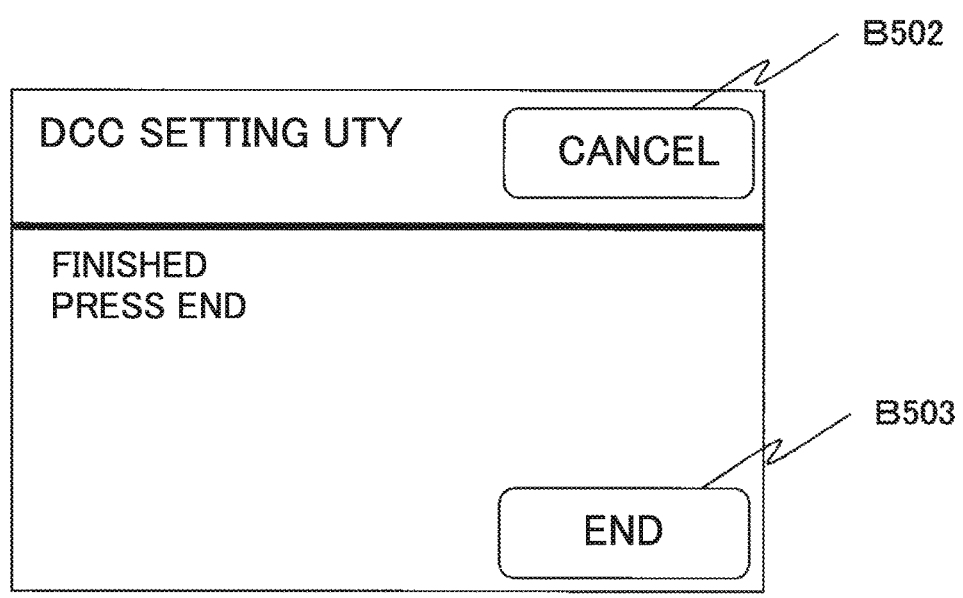
FIG. 18 is an explanatory diagram illustrating an example (a fourth example) of a configuration of a DCC setting UTY screen displayed on an ATM (rear face display section) according to the seventh exemplary embodiment.

Next, when the processing to update the data read from the external storage medium has been completed, the transaction processing section 11 outputs a screen, such as that illustrated in FIG. 18, to notify that data update has been completed. The screen illustrated in FIG. 18 is laid out with an end key B503 to receive selection to end processing to record DCC settlement information from the external storage medium, and a cancel key B502 to receive selection to stop registration of the DCC settlement information.

The transaction processing section 11 receives a commitment to the update content when the end key B503 is pressed by the maintenance operative.

Note that the transaction processing section 11 stops the registration processing if, during processing to record the DCC settlement information (FIG. 16 to FIG. 18), the cancel key B502 is pressed by the maintenance operative.

The pay-out transaction that follows is executed by, for example, processing according to the flowchart of FIG. 3. However, in the processing of step S109 of FIG. 3, the transaction processing section 11 acquires the DCC settlement information from the storage section 20 instead of acquiring it from the host 2. Other processing is similar to the processing illustrated in the flowchart of FIG. 3, and so description thereof is omitted.

In the seventh exemplary embodiment, the ATM 1 acquires the exchange rate to be used in DCC settlement and information about currencies that can be handled even without communicating with the host 2. This enables more flexible operation of the ATM 1 than in the fourth exemplary embodiment.

(H) Other Exemplary Embodiments

The present disclosure is not limited to the above exemplary embodiments, and modified exemplary embodiments such as those listed below may be implemented.

(H-1) In the above exemplary embodiments, settlement by "home currency" has been described as a method of paying a settlement amount at a settlement rate fixed at the time of payout, and settlement by "local currency" has been described as a method of, at a later date, paying a settlement amount converted into the home currency at a settlement (exchange) rate subsequently fixed. In a modified exemplary embodiment, the transaction processing section 11 may implement settlement by performing payout processing in which a substitution is made for the definitions of settlement by "home currency" and settlement by "local currency". Namely, in the modified exemplary embodiment, settlement by "local currency" is defined as a method of paying a settlement amount fixed at a settlement rate at the time of payout, and settlement by "home currency" is defined as a method of, at a later date, paying a settlement amount converted into the home currency at a settlement (exchange) rate subsequently fixed. For example, in the modified exemplary embodiment, the transaction processing section 11 performs settlement (DCC settlement) by "local currency" due to the local currency key B101 being pressed by the customer (FIG. 4).

(H-2) Moreover, the transaction processing section 11 may display, to the customer, another display and not display "local currency" and "home currency". In the end, since selection of "home currency" or "local currency" means the same as selection of DCC settlement (settlement by a rate current at time of payout) or traditional, normal settlement (settlement by a rate current at the time of settlement), the transaction processing section 11 may display a button (key) to select either "normal settlement" or "DCC settlement" from the outset, and let the customer make a selection. The following are descriptions of examples of modified exemplary embodiments.

Figure 19:
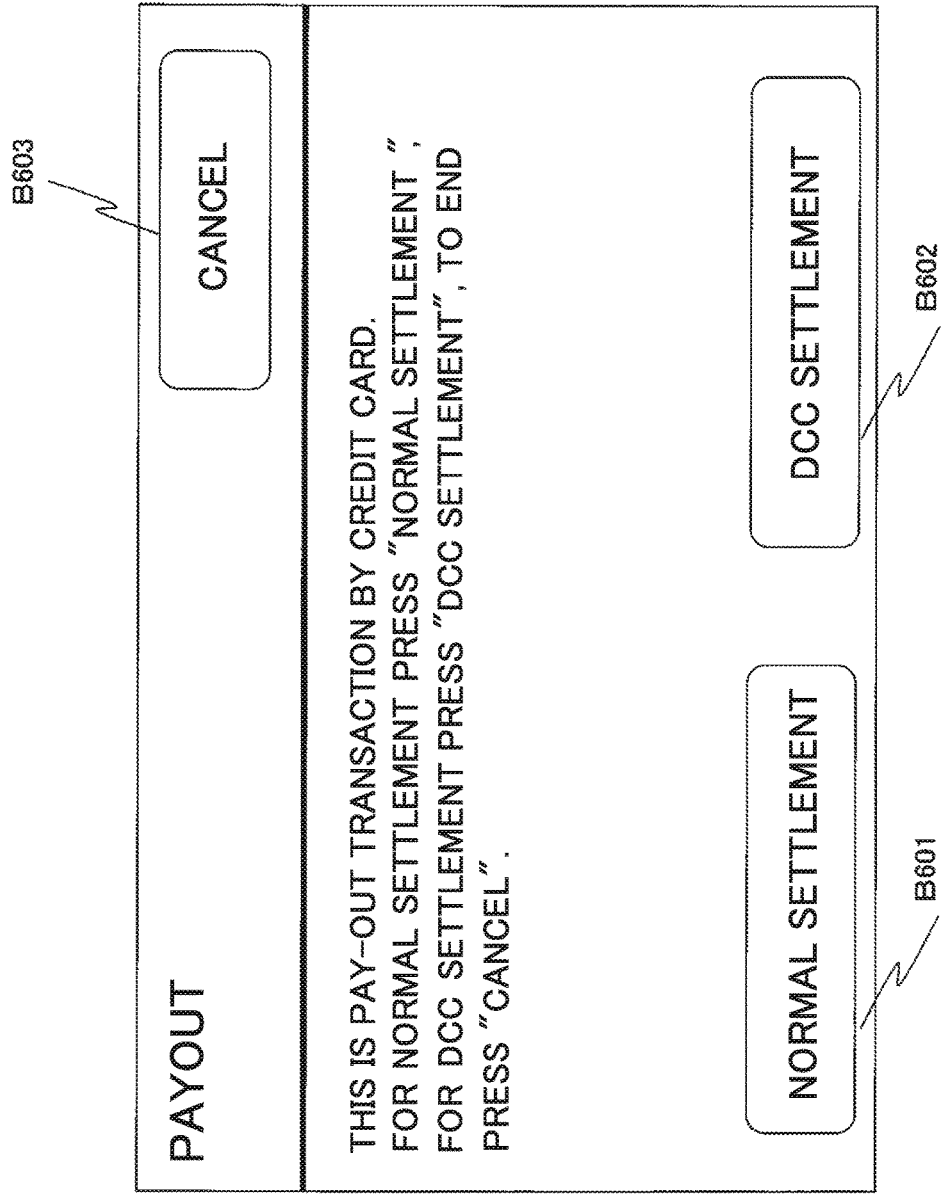
FIG. 19 is an explanatory diagram illustrating an example of a configuration of a DCC selection screen displayed with an ATM (operation display section) according to another exemplary embodiment.

In the first exemplary embodiment, the transaction processing section 11 displays the DCC selection screen illustrated in FIG. 4 and described above on the operation display section 40, and receives selection from the customer (S106). However, the transaction processing section 11 may, for example, display the screen illustrated in FIG. 19 instead of this screen (FIG. 4), and receive selection of the settlement method from the customer. FIG. 19 is an explanatory diagram illustrating an example of configuration of the DCC selection screen. The DCC selection screen illustrated in FIG. 19 is laid out with a normal settlement key B601 to receive selection for normal settlement, a DCC settlement key B602 to receive selection for DCC settlement, and a cancel key B603 to receive selection to stop the transaction.

Moreover, in the second exemplary embodiment, the transaction processing section 11 displays the DCC selection screen (with DCC settlement information) illustrated in FIG. 10 and described above on the operation display section 40, and receives selection from the customer (S209). However, the transaction processing section 11 may, for example, display the screen illustrated in FIG. 20 instead of this screen (FIG. 10) and receive selection of the settlement method by the customer. FIG. 20 is an explanatory diagram illustrating an example of a configuration of a DCC selection screen (with DCC settlement information). The DCC selection screen (with DCC settlement information) illustrated in FIG. 20 is laid out with a normal settlement key B701 to receive selection for normal settlement, a DCC settlement key B702 to receive selection for DCC settlement, and a cancel key B703 to receive selection to stop the transaction. Moreover, on the DCC selection screen (with DCC settlement information) there is DCC settlement information for when DCC settlement is selected displayed on the screen.

(H-3) In the above exemplary embodiments, the ATM 1 (transaction processing section 11) performs the pay-out transaction immediately when the local currency key B101 is pressed by the customer on the DCC selection screen illustrated in FIG. 4. However, instead of performing the pay-out transaction immediately, the ATM 1 (the transaction processing section 11) may, for example, display a popup such as "Settlement in local currency may lead to an unintended payment amount at a later date due to exchange rate fluctuations", and perform the pay-out transaction by local currency settlement only after getting re-confirmation from the customer.

(H-4) In the fourth to seventh exemplary embodiments, the ATM 1 (the transaction processing section 11) acquires, from the host 2, the settlement (exchange) rate to be used in DCC settlement and information about currencies handled as the DCC settlement required information; however, the information to be acquired is not limited thereto. For example, in cases in which the host 2 notifies individual settlement (exchange) rates determined by each credit card issuing company, the ATM (storage section 20) may internally hold settlement rate information to be used in DCC settlement for each credit card company. The ATM 1 (the transaction processing section 11) then performs DCC settlement using the corresponding settlement rate, with reference to the credit card issuing company during a pay-out transaction by credit card.

The entire content of the disclosure of Japanese Patent Application No. 2015-120495 is incorporated by reference in the present specification.

All publications, patent applications, and technical specifications referred to in the present specification are incorporated by reference into the present specification to the same extent as if the individual publication, patent application, or technical specification was specifically and individually indicated to be incorporated by reference.

The invention claimed is:

1. A transaction device for paying out a first currency, the transaction device comprising:
   a display configured to display transaction content; and
   a transaction processing section configured to perform a transaction using an inserted credit card,
   wherein the display displays a settlement selection screen in order to aid a user to select either the first currency or a second currency as a selected currency to settle a pay-out transaction by charging against a credit card account for the credit card based on the selected currency, the settlement selection screen displaying a first amount, a second amount and a settlement rate within one screen, the first amount being an amount of the first currency to be paid out in the transaction by a currency unit of the first currency, the second amount being an amount to be charged against the credit card account for the credit card in a currency unit of the second currency, the settlement rate being an exchange rate between the first currency and the second currency, the transaction processing section causing the display to show at least two out of an indication to cancel the transaction, an indication of the first currency, or an indication of the second currency, thereby to allow the user to select either one out of the indication to cancel the transaction, the indication of the first currency, or the indication of the second currency.

2. The transaction device of the claim 1, wherein the transaction processing section determines whether or not a choice between the first currency and the second currency is possible for the credit card, and when the choice is possible, the display displays the settlement selection screen.

3. The transaction device of the claim 1, wherein the transaction processing section determines whether or not a choice between the first currency and the second currency is possible for the credit card, and when the choice is impossible, the display does not display the settlement selection screen.

4. A transaction device for paying out a first currency, the transaction device comprising:
   a display configured to display transaction content; and
   a transaction processing section configured to perform a transaction using at least an inserted credit card,
   wherein the display displays a first amount, a second amount and a settlement rate within one screen as a settlement selection screen, the first amount being an amount of the first currency to be paid out in the transaction by a currency unit of the first currency, the second amount being an amount to be charged against a credit card account for the credit card in a currency unit of a second currency, the settlement rate being an exchange rate between the first currency and the second currency, the transaction processing section causing the display to show at least two out of an indication to cancel the transaction, the settlement rate at a time of a pay-out transaction, or a notice that the transaction will be settle by a settlement rate subsequent to the pay-out transaction, thereby to allow the user to select one out of the indication to cancel the transaction, the settlement rate at the time of the pay-out transaction, or the notice that the transaction will be settled by the settlement rate subsequent to the pay-out transaction.

5. The transaction device claim 4, wherein the settlement selection screen is displayed at the display in cases in which the credit card is issued in an overseas country.

6. The transaction device of claim 5, wherein the overseas country is a country that issues the second currency.

7. The transaction device of claim 4, wherein the first currency is a currency of a country in which the transaction device is installed, the second currency is a currency of a country in which the credit card is issued.

8. The transaction device of claim 4, further comprising a statement issuing section configured to print and issue a transaction content on a receipt, the receipt including at least a payout amount as the first currency, and, at least when the currency selected for the settlement is the second currency, a settlement amount of the first currency expressed in the currency unit of the second currency and a settlement rate corresponding thereto.

9. The transaction device of claim 4, wherein the second amount is a calculated amount based on the first amount and the settlement rate.

10. The transaction device of claim 9, further comprising a communication section configured to communicate with an external device, wherein the communication section receives second currency settlement information including the settlement rate from the external device.

11. The transaction device of claim 9, wherein the settlement rate is updated at least when the transaction device transitions from a standby state to an operational state, when an electronic text is forcibly transmitted from an external device to the transaction device, when a recording medium or portable memory is connected to the transaction device, or when power to the transaction device is switched ON.

12. The transaction device of claim 9, wherein, when the pay-out transaction in the first currency is to be settled in the second currency, the settlement rate is a rate received by the transaction device or a rate stored in the transaction device.

13. The transaction device of the claim 9, wherein, when the settlement rate is updated before the pay-out transaction or during the pay-out transaction, the display displays an updated settlement rate on the settlement selection screen.

14. The transaction device of the claim 4, wherein the transaction processing section determines whether or not the credit card is an overseas issued card issued overseas, and when the credit card is determined to be the overseas issued card, the display displays the settlement selection screen.

15. A transaction device for paying out a first currency, the transaction device comprising:
   a display configured to display transaction content; and
   a transaction processing section configured to perform a pay-out transaction using a credit card carried by a user,
   wherein, when performing a pay-out transaction in the first currency, the display displays a first amount, a second amount and a settlement rate within one screen as a settlement selection screen, the first amount being an amount of the first currency to be paid out in the transaction by a currency unit of the first currency, the second amount being an amount to be charged against a credit card account for the credit card in a currency unit of a second currency, the settlement rate being an exchange rate between the first currency and the second currency, the transaction processing section causing the display to show at least two out of an indication to cancel the transaction, the settlement rate displayed on the display, or a notice that a settlement rate will be set after the pay-out transaction, thereby to allow the user to select one out of the indication to cancel the transaction, the settlement rate displayed on the display, or the notice that the settlement rate will be set after the pay-out transaction.

16. A transaction device for a transaction in which a first currency is paid out, the transaction device comprising:
a display configured to display an amount of the first currency to be paid out in the transaction; and
a transaction processing section configured to perform the transaction using at least a credit card carried by a user for settling the transaction,
wherein the display displays a first amount, a second amount and a conversion rate within one screen as a settlement selection screen, the first amount being an amount of the first currency to be paid out in the transaction by a currency unit of the first currency, the second amount being an amount to be charged against a credit card account for the credit card in a currency unit of a second currency, the conversion rate being an exchange rate between the first currency and the second currency, the transaction processing section causing the display to show at least two out of an indication to cancel the transaction, the conversion rate displayed on the settlement selection screen, or a notice that a conversion rate will be set after a pay-out transaction, thereby to allow the user to select one out of the indication to cancel the transaction, the conversion rate displayed on the settlement selection screen, or the notice that the conversion rate will be set after the pay-out transaction.

* * * * *